(12) United States Patent
Arai

(10) Patent No.: US 8,587,783 B2
(45) Date of Patent: Nov. 19, 2013

(54) SPECTRAL ESTIMATION PARAMETER GENERATION DEVICE, METHOD OF GENERATING SPECTRAL ESTIMATION PARAMETER, AND SPECTRAL ESTIMATION DEVICE

(75) Inventor: Yoshifumi Arai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 13/472,052

(22) Filed: May 15, 2012

(65) Prior Publication Data
US 2012/0293803 A1 Nov. 22, 2012

(30) Foreign Application Priority Data
May 20, 2011 (JP) ................................. 2011-113484

(51) Int. Cl.
*G01J 3/52* (2006.01)
(52) U.S. Cl.
USPC ........................................................ 356/421
(58) Field of Classification Search
USPC ................................................ 356/402–425
See application file for complete search history.

(56) References Cited

U.S. PATENT DOCUMENTS

2006/0241349 A1\* 10/2006 Gono ............................ 600/160

FOREIGN PATENT DOCUMENTS

JP A-2001-099710 4/2001

\* cited by examiner

*Primary Examiner* — Tarifur Chowdhury
*Assistant Examiner* — Abdullahi Nur
(74) *Attorney, Agent, or Firm* — Oliff & Berridge, PLC

(57) ABSTRACT

A device measures a spectral distribution with respect to each of a plurality of color charts, sets default values to band specification data, and computes a camera output signal based on spectral sensitivity of the multiband camera and spectral feature of light from each of the plurality of charts. The device computes a candidate value of a spectral estimation parameter from the measured spectral distribution of each color chart and the computed camera output signal. The device successively varies the band specification data from the default values to make an evaluation function approach a target value, determines a spectral estimation parameter corresponding to the band specification data when the evaluation function reaches the target value. The evaluation function is defined to correlate the measured spectral distribution of each color chart to a spectral estimation value computed from the candidate value of the spectral estimation parameter and the camera output signal.

6 Claims, 8 Drawing Sheets

SPECTRAL ESTIMATION PARAMETER GENERATION DEVICE, METHOD OF GENERATING SPECTRAL ESTIMATION PARAMETER, AND SPECTRAL ESTIMATION DEVICE

CROSS REFERENCE TO RELATED APPLICATIONS

The present application claims the priority based on Japanese Patent Application No. 2011-113484 filed on May 20, 2011, the disclosure of which is hereby incorporated by reference in its entirety.

BACKGROUND

1. Technical Field

The present invention relates to generating a spectral estimation parameter, which are used for estimating a spectrum of spectral reflectivity of a subject, from a multiband image of the subject taken with and output from a multiband camera, and estimating the spectrum of spectral reflectivity of the subject with the spectral estimation parameter.

2. Description of the Related Art

There is a proposed method of estimating a spectrum of spectral reflectivity of a subject from a multiband image of the subject taken by and output from a multiband camera. This prior art estimating method provides a conversion table in advance for each wavelength band (also referred to as "band") of a multiband image and converts the multiband image of the subject into a set of values of reflectivity according to the conversion tables, so as to estimate the spectrum of spectral reflectivity of the subject.

This prior art method, however, allows highly-accurate estimation of the spectrum of spectral reflectivity from only a multiband image having a significantly large number of bands. The respective bands for measurement are set in advance and may not be optimal for the multiband camera or the subject. The multiband image having the large number of bands is accordingly essential for highly-accurate estimation of the spectrum of spectral reflectivity.

SUMMARY

Consequently, by taking into account the above problems, there is a need to enable highly-accurate estimation of a spectrum of spectral reflectivity from a multiband image having the less number of bands.

In order to achieve at least part of the foregoing, the present invention provides various aspects and embodiments described below.

According to a first aspect, there is provided a parameter generation device configured to generate a spectral estimation parameter, which is used to estimate a spectrum of spectral reflectivity of a subject, from a multiband image of the subject taken in a plurality of wavelength bands set by driving a wavelength tunable filter and output from a multiband camera. The parameter generation device includes: a default value setting module configured to set default values to band specification data used to specify the plurality of wavelength bands; a spectral measurement device configured to measure a spectral distribution with respect to each of a plurality of color charts; a camera output computing module configured to compute a camera output signal representing a multiband image taken by and output from the multiband camera with respect to each of the color charts, based on spectral sensitivity of the multiband camera in the plurality of wavelength bands specified by the band specification data and spectral feature of light from the each color chart; a parameter candidate value computing module configured to compute a candidate value of the spectral estimation parameter, based on the spectral distribution of the each color chart measured by the spectral measurement device and the camera output signal computed by the camera output computing module; an evaluation function controller configured to successively vary the band specification data from the default values to make an evaluation function approach a target value and determine a spectral estimation parameter corresponding to the band specification data when the evaluation function reaches the target value, wherein the evaluation function is defined to correlate the spectral distribution of the each color chart measured by the spectral measurement device to a spectral estimation value computed from the candidate value of the spectral estimation parameter and the camera output signal; and a storage module configured to store the spectral estimation parameter determined by the evaluation function controller and the band specification data when the evaluation function reaches the target value.

The parameter generation device according to the first aspect successively varies the band specification data from the default values, so as to control the evaluation function to approach the target value. The evaluation function is defined to correlate the spectral distribution of the each color chart measured by the spectral measurement device to the spectral estimation value as the estimated spectral distribution. The spectral estimation value is computed from the candidate value of the spectral estimation parameter and the camera output signal. The spectral estimation parameter corresponding to the band specification data when the evaluation function reaches the target value is stored with the band specification data into the storage module. During imaging with the multiband camera, the wavelength tunable filter is driven to sequentially set the wavelength bands (also referred to as "bands") specified by the band specification data stored in the storage module. The spectral estimation parameter stored in the storage module is used to estimate the spectrum of spectral reflectivity of the subject from the multiband image. This allows high-accurate estimation of the spectrum of spectral reflectivity from the multiband image having the less number of bands. The parameter generation device according to the first aspect thus advantageously generates the spectral estimation parameter, which enables the spectrum of spectral reflectivity to be estimated with high accuracy from the multiband image having the less number of bands.

According to one embodiment, there is provided the parameter generation device, wherein the evaluation function controller is configured to sequentially change the candidate value of the spectral estimation parameter.

The parameter generation device according to this embodiment enables optimization of even the nonlinear evaluation function. This generates the spectral estimation parameter that allows the spectral estimation with higher accuracy.

According to another embodiment, there is provided the parameter generation device, wherein the evaluation function includes a weighting coefficient based on a color-matching function.

The parameter generation device according to this embodiment enables estimation of the spectrum of spectral reflectivity with consideration of the color difference.

According to yet another embodiment, there is provided the parameter generation device, wherein the evaluation function is defined by squared norm of error of the spectral estimation value relative to the spectral distribution of the each color chart.

The parameter generation device according to this embodiment enables the spectral estimation value to approach the spectral distribution of each color chart.

According to a second aspect, there is provided a spectral estimation device configured to estimate a spectrum of spectral reflectivity of a subject from a multiband image of the subject taken in a plurality of wavelength bands set by driving a wavelength tunable filter and output from a multiband camera. The spectral estimation device includes: an estimation device storage module configured to store a spectral estimation parameter, which is used to estimate a spectrum of spectral reflectivity of the subject, and band specification data used to specify the plurality of wavelength bands; a band specifier configured to send the band specification data stored in the estimation device storage module to the multiband camera and thereby specify the plurality of wavelength bands for imaging with the multiband camera; a multiband image acquirer configured to obtain a multiband image taken in the respective wavelength bands from the multiband camera; and an optical spectrum operator configured to compute the spectrum of spectral reflectivity from the multiband image using the spectral estimation parameter stored in the estimation device storage module.

The spectral estimation device according to the second aspect specifies the wavelength bands adequate for the multiband camera and uses the refined spectral estimation parameter for computing the spectrum of spectral reflectivity from the multiband image taken in the adequate wavelength bands. The spectral estimation device thus advantageously enables highly-accurate estimation of the spectrum of spectral reflectivity from the multiband image.

According to a third aspect, there is provided a method of generating a spectral estimation parameter, which is used to estimate a spectrum of spectral reflectivity of a subject, from a multiband image of the subject taken in a plurality of wavelength bands set by a wavelength tunable filter and output from a multiband camera. The method sets default values to band specification data used to specify the plurality of wavelength bands; measures a spectral distribution with respect to each of a plurality of color charts by a spectral measurement device; and computes a camera output signal representing a multiband image taken by and output from the multiband camera with respect to each of the color charts, based on spectral sensitivity of the multiband camera in the plurality of wavelength bands specified by the band specification data and spectral feature of light from the each color chart. The method further computes a candidate value of the spectral estimation parameter, based on the spectral distribution of the each color chart measured by the spectral measurement device and the camera output signal; and successively varies the band specification data from the default values to make an evaluation function approach a target value and determines a spectral estimation parameter corresponding to the band specification data when the evaluation function reaches the target value. The evaluation function is defined to correlate the spectral distribution of the each color chart measured by the spectral measurement device to a spectral estimation value computed from the candidate value of the spectral estimation parameter and the camera output signal. The method then stores the determined spectral estimation parameter and the band specification data when the evaluation function reaches the target value, into a storage module.

Like the parameter generation device according to the first aspect described above, the method of generating the spectral estimation parameter according to the third aspect advantageously generates the spectral estimation parameter, which enables the spectrum of spectral reflectivity to be estimated with high accuracy from the multiband image having the less number of bands.

The present invention may be implemented by a variety of aspects and applications, other than those described above, for example, a freshness evaluation system including the parameter generation device with the multiband camera.

For example, according to one aspect of the invention, there is provided a device including at least one element among six elements, i.e., a setting module, a measurement device, a first computing module, a second computing module, an controller and a storage module. In other words, the device may include or may not include the setting module. This device may include or may not include the measurement device. This device may include or may not include the first computing module. This device may include or may not include the second computing module. This device may include or may not include the controller. This device may include or may not include the storage module. The setting module may be configured to, for example, set default values to band specification data used to specify a plurality of wavelength bands. The measurement device may be configured to, for example, measure a spectral distribution with respect to each of a plurality of color charts. The first computing module may be configured to, for example, compute a camera output signal representing a multiband image taken by and output from a multiband camera with respect to each of the color charts, based on spectral sensitivity of the multiband camera in the plurality of wavelength bands specified by the band specification data and spectral feature of light from each color chart. The second computing module may be configured to, for example, compute a candidate value of the spectral estimation parameter, based on the spectral distribution of each color chart and the camera output signal. The controller may be configured to, for example, successively vary the band specification data from the default values to make an evaluation function approach a target value and determine a spectral estimation parameter corresponding to the band specification data when the evaluation function reaches the target value. The evaluation function may be defined to correlate the spectral distribution of each color chart to a spectral estimation value computed from the candidate value of the spectral estimation parameter and the camera output signal. The storage module may be configured to, for example, store the spectral estimation parameter and the band specification data when the evaluation function reaches the target value. This device may be implemented as, for example, the parameter generation device but may also be implemented as any of various devices other than the parameter generation device. This aspect has at least one of advantageous effects including size reduction of the device, cost saving, resource saving, easy manufacturing, and improved convenience. Part or all of the technical matters according to the respective embodiments of the parameter generation device described above may be applied to this device.

For example, according to one aspect of the invention, there is provided a device including at least one element among four elements, i.e., a storage module, a specifier, a image acquirer and an operator. In other words, the device may include or may not include the storage module. This device may include or may not include the specifier. This device may include or may not include the image acquirer. This device may include or may not include the operator. The storage module may be configured to, for example, store a spectral estimation parameter, which is used to estimate a spectrum of spectral reflectivity of the subject, and band specification data used to specify the plurality of wavelength bands. The specifier may be configured to, for example, send the band specification data to the multiband camera and thereby specify the plurality of wavelength bands for imaging with the multiband camera. The image acquirer may be configured to, for example, obtain a multiband image taken in the respective wavelength bands from the multiband camera. The operator may be configured to, for example, compute the spectrum of spectral reflectivity from the multiband image using the spectral estimation parameter. This device may be implemented as, for example, the parameter generation device but may also be implemented as any of various devices other than the parameter generation device. This aspect has at least one of advantageous effects including size reduction of the device, cost saving, resource saving, easy manufacturing, and improved convenience. Part or all of the technical matters according to the respective embodiments of the parameter generation device described above may be applied to this device.

DESCRIPTION OF THE PREFERRED EMBODIMENTS

The invention is described in detail with reference to some embodiments.

A. First Embodiment

A-1. Spectral Estimation Parameter Generation Device

Figure 1:
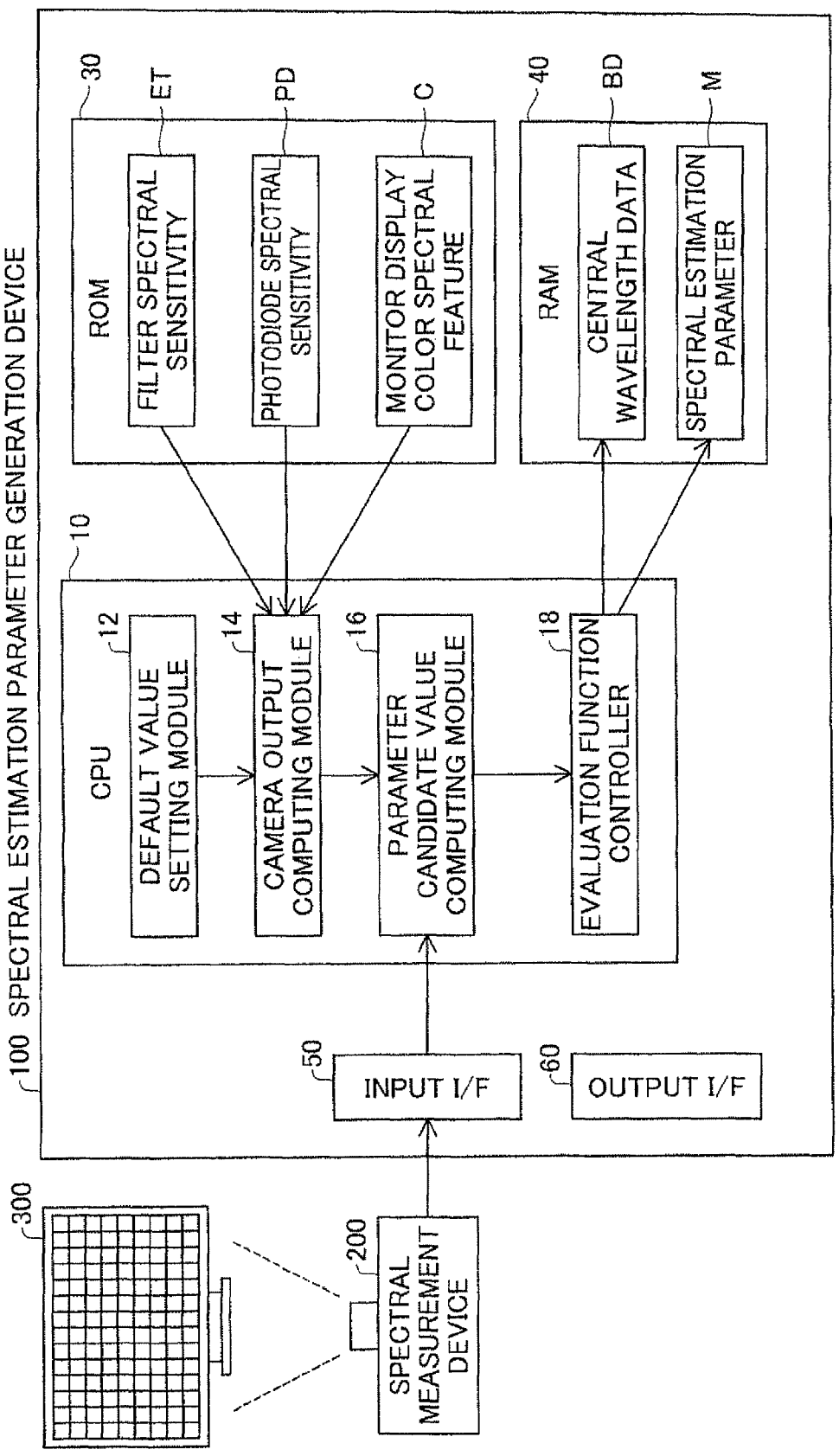
FIG. 1 illustrates the general configuration of a spectral estimation parameter generation device according to a first embodiment of the invention.

FIG. 1 illustrates the general configuration of a spectral estimation parameter generation device 100 according to a first embodiment of the invention. As illustrated, the spectral estimation parameter generation device 100 is electrically connected with a spectral measurement device 200.

The spectral estimation parameter generation device 100 includes a CPU 10 configured to execute computer programs to implement various operations and controls, a ROM (memory, storage unit) 30 configured to store the computer programs, data and information, a RAM 40 configured to temporarily save data, an input interface (I/F) 50 and an output interface (I/F) 60. The spectral estimation parameter generation device 100 obtains spectral distribution data measured by the spectral measurement device 200 via the input interface (I/F) 50.

The ROM 30 is a read only memory serving to store various computer programs and various data. The computer programs stored in advance include a spectral estimation parameter generating program. As illustrated, the various data stored in advance include filter spectral sensitivity ET, photodiode spectral sensitivity PD, and monitor display color spectral feature C used for generating a spectral estimation parameter. These data ET, PS and C will be described later in detail. The RAM 40 is a readable and writable memory.

The CPU 10 executes the spectral estimation parameter generating program stored in the ROM 30, so as to serve as a default value setting module 12, a camera output computing module 14, a parameter candidate value computing module 16, and an evaluation function controller 18. The CPU 10 sequentially implements the respective functional blocks 12 to 18, so as to generate a spectral estimation parameter M based on spectral distribution data obtained by the spectral measurement device 200 and store the generated spectral estimation parameter M together with central wavelength data BD (described later) in the RAM 40.

The spectral measurement device 200 is a known device serving to measure the spectral distribution representing the wavelength characteristic of a measurement object by making the light from the measurement object pass through a spectroscope and receiving the spectrum output from the spectroscope on an imaging plane of an imaging element. The measurement object herein is the screen of a monitor 300.

The monitor 300 simultaneously displays a plurality of color charts on a single screen. The color charts are color samples respectively emitting lights in different wavelength bands in a preset wavelength range (for example, visible light range of 380 nm to 780 nm). For example, 100 or 200 color charts may be provided herein. The spectral measurement device 200 measures the spectral distribution of each color chart displayed on the monitor 300. The monitor 300 may be configured to simultaneously display one or multiple color charts among the plurality of available color charts. In this application, the monitor 300 sequentially repeats the display of different color charts, so as to successively display all the plurality of available color charts.

The plurality of color charts are provided in the form of color display on the monitor 300 according to this embodiment, but may be provided by irradiating color chips of respective colors with a light source according to another embodiment. In other words, while the spectral measurement device 200 of this embodiment measures the color lights emitted from the monitor 300 as the color charts, this another embodiment measures the reflected lights from the respective color chips as the color charts.

A-2. Spectral Estimation Parameter Generating Process

As described above, the CPU 10 executes the spectral estimation parameter generating program stored in the ROM 30 to implement the spectral estimation parameter generating process.

Figure 2:
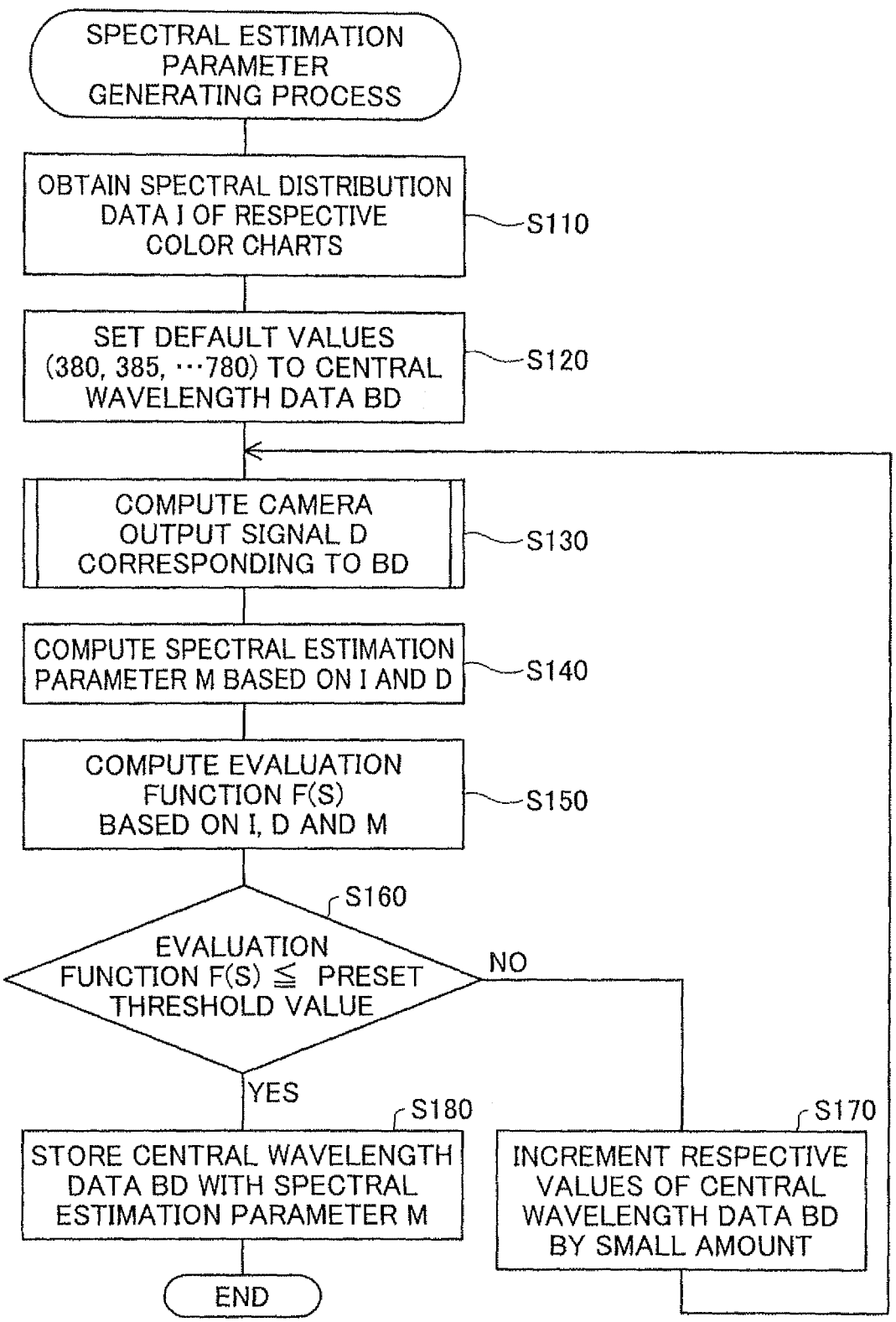
FIG. 2 is a flowchart showing a procedure of spectral estimation parameter generating process.

FIG. 2 is a flowchart showing a procedure of spectral estimation parameter generating process. As illustrated, on the start of the processing flow, the CPU 10 drives the spectral measurement device 200 to obtain spectral distribution data I measured by the spectral measurement device 200 (step S110). The measurement by the spectral measurement device 200 takes images of the respective color charts displayed on the monitor 300 with the spectral measurement device 200.

After acquisition of the spectral distribution data I at step S110, the CPU 10 sets default values to the central wavelength data BD, which may be used to specify the wavelength bands for imaging with a multiband camera (step S120). The structure of a multiband camera 400 is described below for the purpose of explaining the "multiband camera" and the "central wavelength data".

Figure 3:
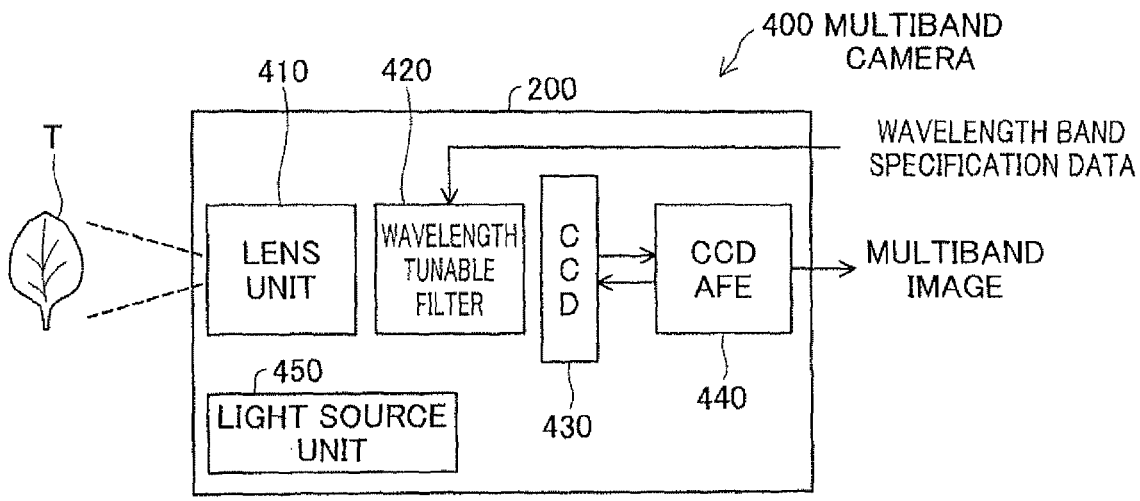
FIG. 3 schematically illustrates the internal structure of a multiband camera.

FIG. 3 schematically illustrates the internal structure of the multiband camera 400. As illustrated, the multiband camera 400 includes a lens unit 410, a wavelength tunable filter 420, a CCD (charge-coupled device) 430, a CCDAFE (analog front end) 440, and a light source unit 450.

The lens unit 410 is not provided with the auto-focusing mechanism to focus on a subject T (measurement object) according to this embodiment, but may be provided with the auto-focusing mechanism. The wavelength tunable filter 420 used in this embodiment is a liquid crystal etalon filter (Fabry-Perot filter) having the variable transparent wavelength range. The CCD 430 serves as an imaging device to perform photoelectric conversion of the light transmitted through the wavelength tunable filter 420 and obtain an electrical signal representing an image of the subject T. The CCDAFE 440 serves to digitize the detection signal of the CCD 430. The light source unit 450 serves to illuminate the subject T.

In the multiband camera 400 of this structure, the wavelength tunable filter 420 sequentially receives external specification of a plurality of optical wavelength bands for imaging, so as to sequentially change its transparent wavelength range. The multiband camera 400 accordingly takes the image of the sample T at the sensitivity of the plurality of wavelength bands (multiband).

Referring back to the flowchart of FIG. 2, the central wavelength data BD set to the default values at step S120 are used to give specification of a plurality of wavelength bands (hereinafter referred to as "bands") for imaging with the multiband camera 400 to the wavelength tunable filter 420 of the multiband camera 400. According to this embodiment, the respective bands are specified by their central wavelengths. The default values are 81 data at 5 nm intervals in the wavelength range of 380 nm to 780 nm, i.e., 380 nm, 385 nm, . . . , and 780 nm, and are set to the central wavelength data BD.

The default values set to the central wavelength data BD are not limited to the above 81 data but may be any plural number of data, e.g., 41 data at 10 nm intervals. The intervals herein may be equal intervals or may be varying intervals. The wavelength range is not limited to the visible light range but may be 380 nm to 1100 nm including infrared wavelengths. Each of the wavelength bands may be specified by the wavelength of a starting point of each wavelength band or by the wavelength of an end point of each wavelength band, instead of by the central wavelength. The central wavelength data BD corresponds to "band specification data" described in Summary section above.

The CPU 10 subsequently computes a camera output signal D corresponding to the central wavelength data BD (step S130). The camera output signal D has signal values of a multiband image of the subject T taken with the multiband camera 400 in the respective bands specified by the central wavelength data BD and is computed by the following procedure.

Figure 4:
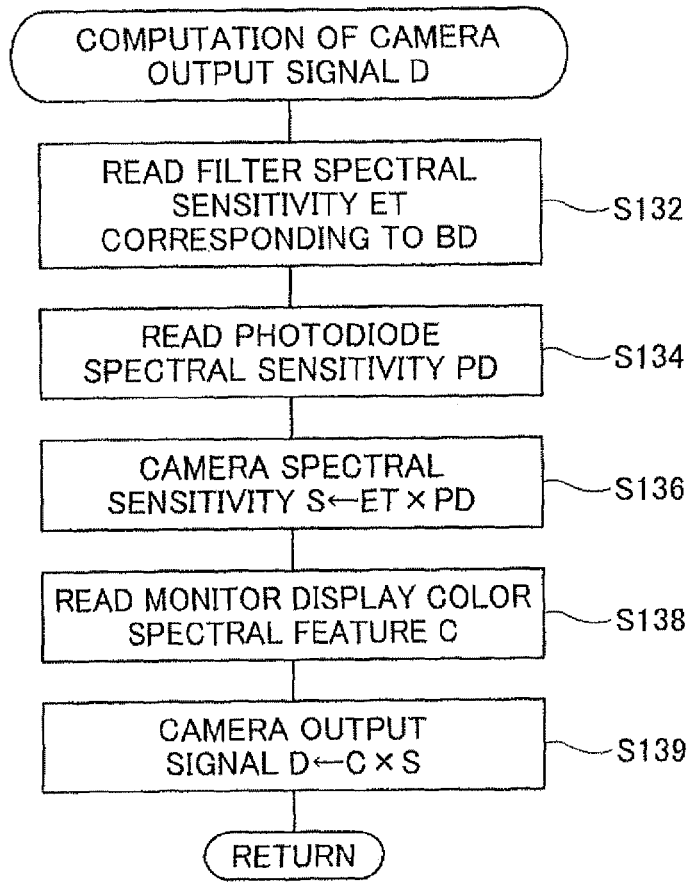
FIG. 4 is a flowchart showing the details of computation of a camera output signal at step S130 in the spectral estimation parameter generating process of FIG. 2.

FIG. 4 is a flowchart showing the details of the computation process of the camera output signal D at step S130 (FIG. 2). As illustrated, when the processing flow enters this computation process, the CPU 10 reads the filter spectral sensitivity ET corresponding to the central wavelength data BD from the ROM 30 (step S132).

A large number of etalon sensitivities of respective bands specified by arbitrary wavelengths (e.g., wavelengths at 1 nm intervals) in the wavelength range of 380 nm to 780 nm as central wavelengths are stored in advance in the ROM 30. The process of step S132 selects the etalon sensitivities corresponding to the respective values of the central wavelength data BD among the large number of etalon sensitivities and reads a set of the selected etalon sensitivities as the filter spectral sensitivity ET from the ROM 30. The etalon sensitivities stored in advance in the ROM 30 depend on the model of the multiband camera 400 and are exclusive for the present model of the multiband camera 400.

Figure 5:
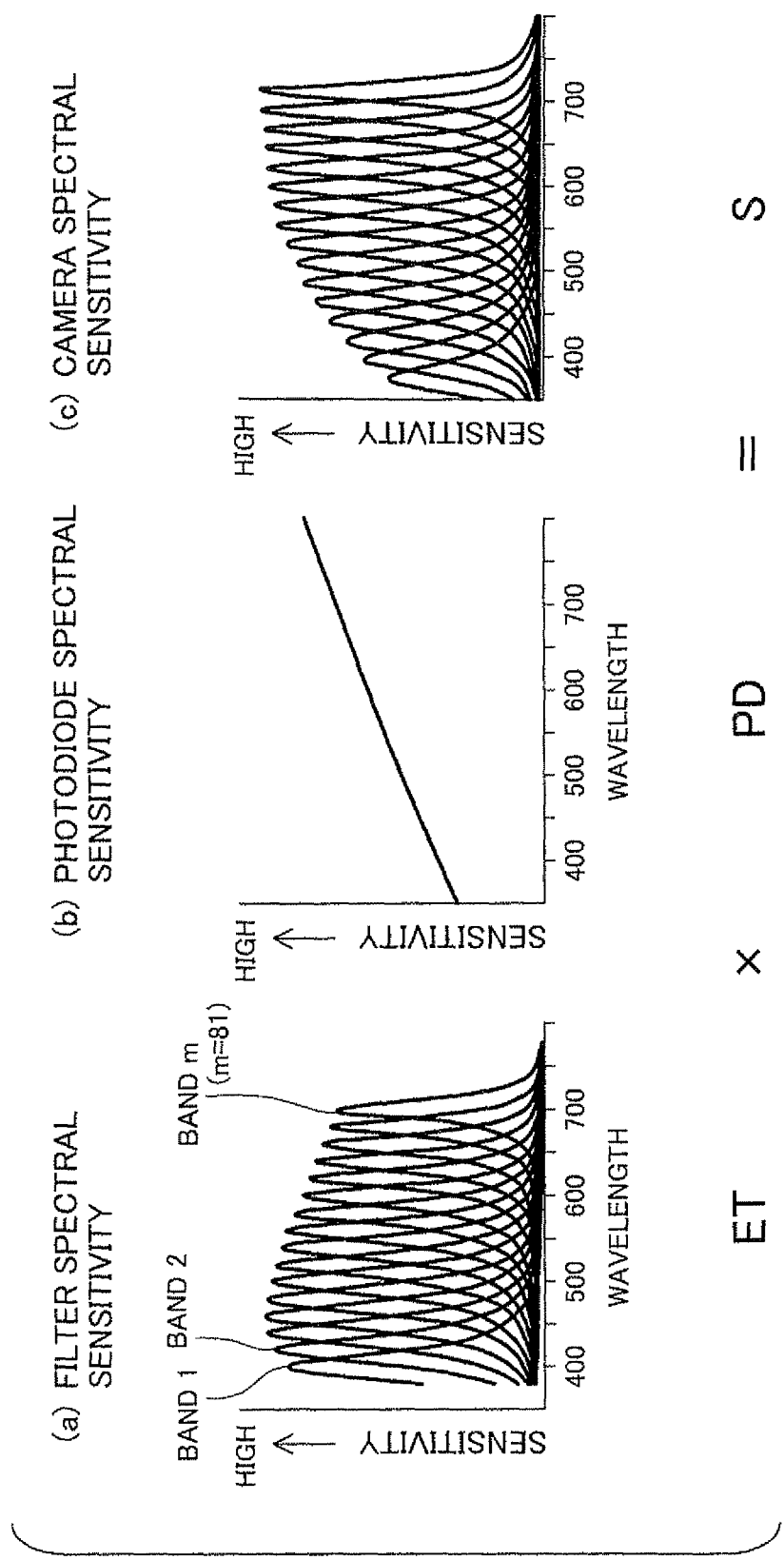
FIG. 5 schematically illustrates a first half of computation of the camera output signal.
Figure 6:
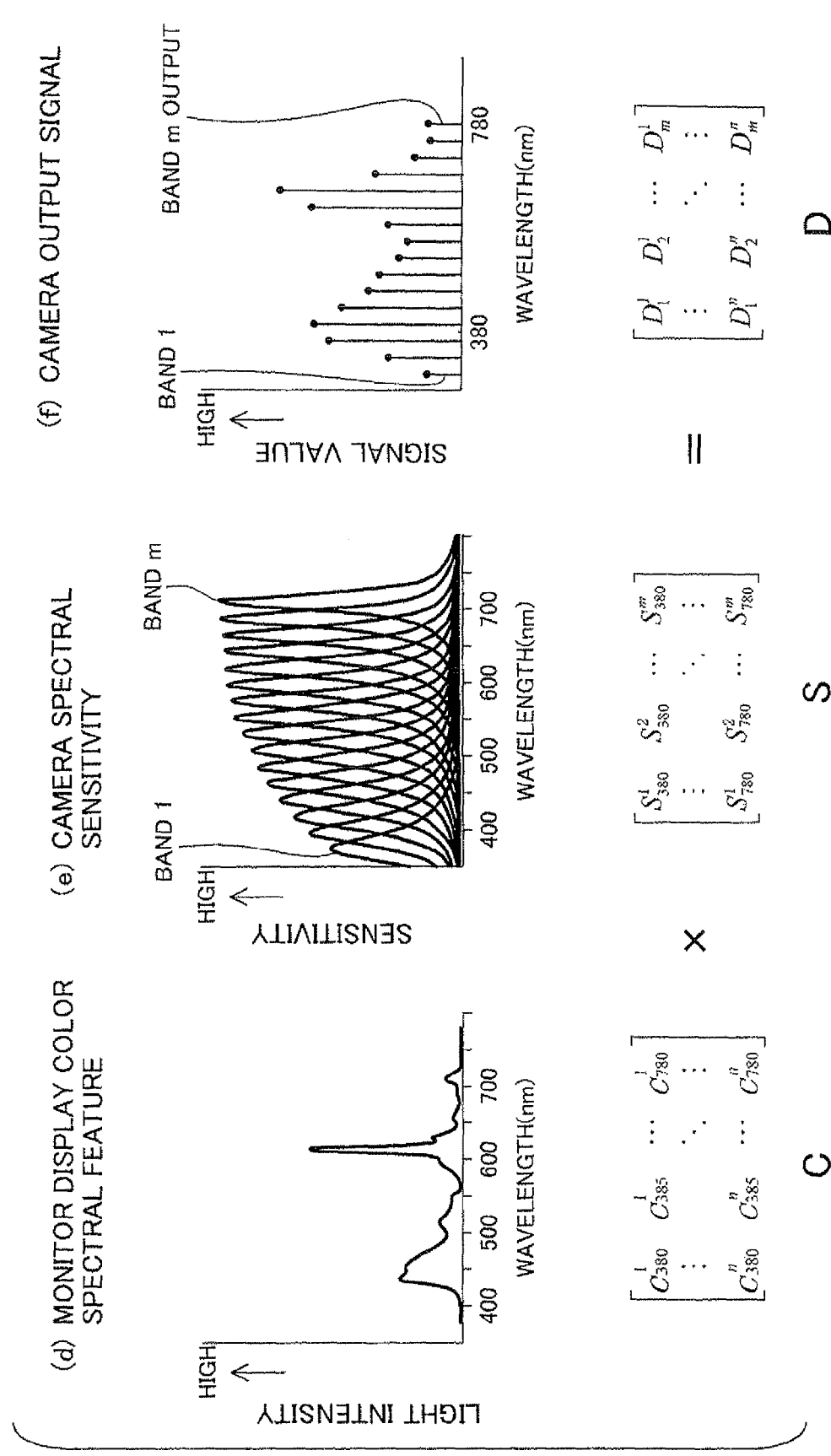
FIG. 6 schematically illustrates a second half of computation of the camera output signal.

FIGS. 5 and 6 graphically illustrate the computation process of the camera output signal D at step S130 (FIG. 2). The filter spectral sensitivity ET read from the ROM 30 at step S132 is shown in the graph of FIG. 5(a). As illustrated, the filter spectral sensitivity ET shows the sensitivities of the respective wavelength bands, band 1 to band m, wherein "m" represents the number of data set as the default values at step S120 and is equal to 81 according to this embodiment. The band 1 is a wavelength band of a preset bandwidth around 380 nm, band 2 is a wavelength band of a preset bandwidth around 385 nm, and band m is a wavelength band of a preset bandwidth around 780 nm.

After reading the filter spectral sensitivity ET at step S132, the CPU 10 reads the photodiode spectral sensitivity PD from the ROM 30 (step S134). The photodiode spectral sensitivity PD means the sensitivity of elements (photodiodes) constituting the CCD 230 of the multiband camera 400 and increases with an increase in wavelength as shown in FIG. 5(b). The photodiode spectral sensitivity PD stored in the ROM 30 also depends on the model of the multiband camera 400 and is exclusive for the present model of the multiband camera 400.

The CPU 10 subsequently multiplies the filter spectral sensitivity ET read at step S132 by the photodiode spectral sensitivity PD read at step S134 to compute the spectral sensitivity of the multiband camera 400 (hereinafter referred to as "camera spectral sensitivity") S (step S136). The camera spectral sensitivity S also depends on the model of the multiband camera 400.

The camera spectral sensitivity S thus obtained is the product of FIG. 5(a) and FIG. 5(b) and is defined by the feature shown in FIG. 5(c). The camera spectral sensitivity S is expressed by a transposed matrix of an m×n matrix as shown by Equation (1) given below and is rewritten as Equation (2) given below, where "m" represents the number of bands as mentioned above, and "n" represents the number of color charts displayed on the monitor 300.

$$S = \begin{bmatrix} S^1_{380} & S^1_{385} & \cdots & S^1_{780} \\ \vdots & & \ddots & \vdots \\ S^m_{380} & S^m_{385} & \cdots & S^m_{780} \end{bmatrix}^t \quad (1)$$

$$= \begin{bmatrix} S^1_{380} & S^2_{380} & \cdots & S^m_{380} \\ \vdots & & \ddots & \vdots \\ S^1_{780} & S^2_{780} & \cdots & S^m_{780} \end{bmatrix} \quad (2)$$

Referring back to the flowchart of FIG. 4, after computing the camera spectral sensitivity S at step S136, the CPU 10 reads the monitor display color spectral feature C from the ROM 30 (step S138). The monitor display color spectral feature C is data representing the spectral distributions of the respective color charts displayed on the monitor 300 and is obtained by measuring the respective color charts with a colorimeter. The colorimeter may be, for example, PR-650 manufactured by Photo Research Inc.

FIG. 6(d) shows the monitor display color spectral feature C. The upper half of FIG. 6(d) is a graph showing the spectral distribution of one color chart, and the lower half of FIG. 6(d) shows a matrix representing the monitor display color spectral feature C read from the ROM 30. As shown in the graph of FIG. 6(d), the spectral distribution of one color chart is defined by the light intensities at the respective wavelengths. The spectral distributions obtained for all the color charts displayed on the monitor 300 are provided as the monitor display color spectral feature C.

The monitor display color spectral feature C can be expressed by an n×m matrix shown in the lower half of FIG. 6(d), where "n" represents the number of color charts and "m" represents the number of bands used by the multiband camera 400. This matrix shows the light intensities in the respective bands for all the color charts. The values in this matrix are the accurate values measured with the colorimeter (i.e., values with high accuracy).

Referring back to FIG. 4, after reading the monitor display color spectral feature C at step S138, the CPU 10 multiplies the monitor display color spectral feature C read at step S138 by the camera spectral sensitivity S computed at step S136 to compute the camera output signal D having the signal values of the multiband image taken by the multiband camera 400 (step S139).

FIG. 6(e) shows the camera spectral sensitivity S. The upper half of FIG. 6(e) is identical with the graph of FIG. 5(c), and the lower half of FIG. 6(e) is identical with the matrix expressed by Equation (2) given above. FIG. 6(f) shows the camera output signal D. The upper half of FIG. 6(f) is a graph showing the camera output signal of one color chart, and the lower half of FIG. 6(f) shows a matrix representing the camera output signal D as the result of computation at step S139. As shown by the graph of FIG. 6(f), the camera output signal of one color chart is given to have the signal values in the respective bands. The signal value distributions obtained for all the color charts displayed on the monitor 300 are provided as the camera output signal D.

The camera output signal D can be expressed by an n×m matrix shown in the lower half of FIG. 6(f), where "n" represents the number of color charts and "m" represents the number of bands used by the multiband camera 400. This matrix shows the output signal values in the respective bands for all the color charts. After step S139 in FIG. 4, the processing flow goes to "Return" to terminate this computation process of the camera output signal D.

This procedure of computation of the camera output signal D computes the camera spectral sensitivity S at step S136 and then computes the camera output signal D from the camera spectral sensitivity S at step S139. According to another embodiment, the procedure may omit the processing of step S136 and compute the camera output signal D from the filter spectral sensitivity ET, the photodiode spectral sensitivity PD, and the monitor display color spectral feature C at step S139.

Referring back to the flowchart of FIG. 2, after conclusion of the computation process of the camera output signal D at step S130, the processing flow goes to step S140. At step S140, the CPU 10 computes the spectral estimation parameter M, based on the spectral distribution data I obtained at step S110 and the camera output signal D computed at step S130.

The spectral estimation parameter M represents the relationship between the multiband image of the subject T taken with and output from the multiband camera 400 and the spectrum of spectral reflectivity (spectral distribution) of the subject T. The spectral distribution of the subject T is equivalent to the spectral distribution data (hereinafter also referred to as "spectral distribution") I obtained from the spectral measurement device 200 at step S110. The spectral distribution I is accordingly expressed by Equation (3) given below.

$$I = M \cdot D + \chi \quad (3)$$

Herein $\chi$ represents an approximation error. The squared norm of the approximation error $\chi$ is given by Equation (4) below.

$$\Delta^2 \equiv \|\chi\|^2 = \|I - M \cdot D\|^2 \quad (4)$$

Partially differentiating both sides of Equation (4) with M gives Equation (5) below.

$$\frac{\partial \Delta^2}{\partial M} = -2(D^t I - D^t D M) \quad (5)$$

When the left side of Equation (5) is equal to 0, $\Delta^2$ is minimized. This gives Equation (6) and further Equation (7) below.

$$0 = -2(D^t I - D^t D M) \quad (6)$$

$$D^t D M = D^t I \quad (7)$$

Equation (7) is rewritten as Equation (8).

$$M = (D^t D)^{-1} D^t I \quad (8)$$

The process of step S140 substitutes the spectral distribution I obtained at step S110 and the camera output signal D computed at step S130 in Equation (8) to compute the spectral estimation parameter M.

Equation (8) is satisfied as long as the camera output signal D is regular. When the camera output signal D is not regular, Equation (8) is rewritten as Equation (9) with Moore-Penrose pseudo-inverse.

$$M = \text{pinv}(D) \cdot I \quad (9)$$

When the camera output signal D is not regular, the process of step S140 substitutes the spectral distribution I obtained at step S110 and the camera output signal D computed at step S130 in Equation (9) to compute the spectral estimation parameter M.

As described above, the default values are set to the central wavelength data BD at step S120. The state of setting the default values to the central wavelength data BD means the state that the wavelength tunable filter 420 of the multiband camera 400 has the default characteristics. This state is hereinafter referred to as "default filter characteristics". In the first cycle of the spectral estimation parameter generating process, the spectral estimation parameter M based on the default filter characteristics is computed at step S140.

The computation process at step S140 may employ Wiener estimation or computation with R matrix, instead of the computation method described above.

After the computation at step S140, the CPU 10 computes an evaluation function F(S), based on the spectral distribution I obtained at step S110, the camera output signal D computed at step S130 and the spectral estimation parameter M computed at step S140 (step S150).

The evaluation function F(S) is the function of the camera spectral sensitivity S described above and is computed from the spectral distribution I, the camera output signal D and the spectral estimation parameter M according to Equation (10) given below. There is a relationship between the camera output signal D, the spectral distribution I and the camera spectral sensitivity S shown by Equation (11) given below.

$$F(S)=\|I-M\cdot D\|^2 \quad (10)$$

$$D=I\cdot S \quad (11)$$

As shown by Equation (10) given above, the evaluation function F(S) is defined by the squared norm of the error of the spectral estimation value, which is the product of the spectral estimation parameter M and the camera output signal D, from the spectral distribution I measured by the spectral measurement device 200.

After the computation at step S150, the CPU 10 determines whether the evaluation function F(S) computed at step S150 is equal to or less than a preset threshold value (step S160). When it is determined that the evaluation function F(S) is not equal to or less than the preset threshold value but is greater than the preset threshold value (step S160: No), the CPU 10 increments the respective values of the central wavelength data BD by a small amount (step S170). The small amount is, for example, 0.1 nm. In the first cycle of the spectral estimation parameter generating process, the respective values of the central wavelength data BD are incremented from the default values 380 nm, 385 nm, 780 nm to 380.1 nm, 385.1 nm, . . . , 780.1 nm. In each subsequent cycle, the respective values are incremented by 0.1 nm.

The small amount is not limited to 0.1 nm but may be any suitable amount. The respective values of the central wavelength data BD are incremented by the small amount according to this embodiment, but may be decremented by a small amount according to another embodiment. In other words, the respective values of the central wavelength data BD are to be sequentially shifted in one direction, i.e., either increasing direction or decreasing direction. The nonlinear optimization technique may be adopted for the process of step S150.

After increment at step S170, the CPU 10 returns the processing flow to step S130 and repeats the processing of steps S130 to S170. The processing of steps S130 to S160 is performed for the new values of the central wavelength data BD incremented at step S170. Repeating this series of processing controls the evaluation function F(S) computed at step S150 to approach the preset threshold value. According to this embodiment, when the evaluation function F(S) becomes equal to or less than the preset threshold value (step S160: Yes), it is assumed that the evaluation function F(S) is minimized and is optimized. Any known optimization technique, such as quasi-Newton's method like BFGS method or conjugate gradient method, may be employed for the repetition of steps S130 to S170.

On the optimization of the evaluation function F(S), i.e., when the evaluation function F(S) becomes equal to or less than the preset threshold value, the processing flow goes to step S180 in response to the affirmative answer at step S160. At step S180, the CPU 10 stores the central wavelength data BD and the spectral estimation parameter M on the optimization of the evaluation function F(S), into the RAM 40. The central wavelength data BD and the spectral estimation parameter M stored in the RAM 40 may be sent outside via the output interface 60, as needed basis.

Repeating the processing of steps S130 to S170 is equivalent to the operation of Equation (12) given below.

$$(S_1, S_2, \ldots S_m) = \arg\min\{F(S)\} \quad (12)$$

Equation (12) gives a set of values of the camera spectral sensitivity S for the minimized evaluation function F(S). The process of step S180 stores the central wavelength data BD and the spectral estimation parameter M corresponding to the given set of values of the camera spectral sensitivity S.

The computation process of the camera output signal D at step S130 requires the filter spectral sensitivity ET corresponding to the respective values of the central wavelength data BD incremented by the small amount to be read at step S132. The filter spectral sensitivity ET for any desired central wavelength may be generated by interpolation of the etalon sensitivities at the respective wavelengths stored in advance in the ROM 30.

The flowchart of FIG. 2 does not include the error processing performed when the evaluation function F(S) fails to be optimized, but may be modified to include the error processing as needed basis. For example, when the total amount of increments at step S170 exceeding a preset amount still fails to change the negative answer to the affirmative answer at step S160, the modified flow may not allow generation of the spectral estimation parameter and terminate this spectral estimation parameter generating process. The preset amount (preset value) may be, for example, the interval of the default values of the central wavelength data BD set at step S120 (5 nm in this embodiment).

As described above, the spectral estimation parameter generating process determines the spectral estimation parameter M to make the spectral estimation value (=M·D) approach the spectral distribution I as the accurate value measured by the spectral measurement device 200. The determined spectral estimation parameter M is stored with the central wavelength data BD suitable for the spectral estimation parameter M in the RAM 40. In other words, the spectral estimation parameter generating process optimizes both the spectral estimation parameter M and the bands of the multiband camera 400 specified by the central wavelength data BD, and stores the optimal spectral estimation parameter M and the optimal central wavelength data BD. The terms "optimization" and "optimal" used herein mean "refinement" and "refined" in the stricter sense, since the evaluation function is not actually minimized but is only assumed to be minimized and optimized when the evaluation function becomes equal to or less than the preset threshold value as explained previously.

According to the above embodiment, the evaluation function is assumed to be "optimized" when the evaluation function becomes equal to or less than the preset threshold value as described above. The processing flow may be modified to go to step S180 when the evaluation function is minimized and is thereby expected to be optimized. The "target value" described in Summary section may be the preset threshold value like the above embodiment but may be the minimum possible value of the evaluation function.

The processing of step S120 executed by the CPU 10 corresponds to the function of the default value setting module 12 (FIG. 1). Similarly, the processing of step S130 corresponds to the function of the camera output computing module 14, and the processing of step S140 corresponds to the function of the parameter candidate value computing module 16. The repetition of steps S130 to S170 corresponds to the function of the evaluation function controller 18.

A-3. Spectral Image Processing Device

The following describes a spectral image processing device 500 that utilizes the central wavelength data BD and the spectral estimation parameter M generated by the spectral estimation parameter generation device 100.

Figure 7:
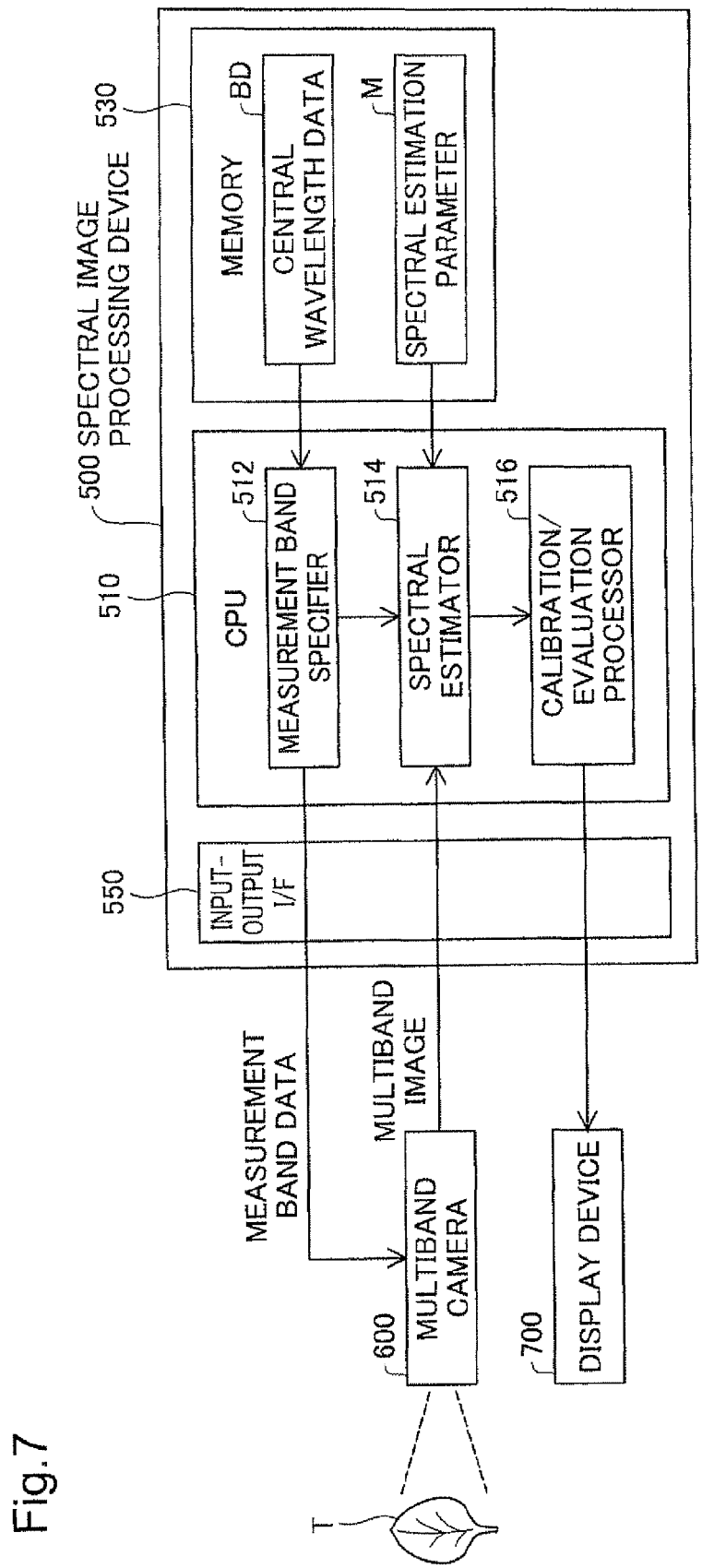
FIG. 7 schematically illustrates a spectral image processing device and its periphery.

FIG. 7 schematically illustrates the spectral image processing device 500 and its periphery. As illustrated, a multiband camera 600 and a display device 700 are electrically connected with the spectral image processing device 500.

The spectral image processing device 500 is configured to estimate a spectrum of spectral reflectivity of a subject T from a multiband image of the subject T taken with the multiband camera 600, compute a feature value of a specific component contained in the subject T from the estimation result, and evaluate the subject T based on the computed feature value. According to this embodiment, the subject T is a green vegetable, and the specific component contained in the subject T is chlorophyll. The spectral image processing device 500 accordingly computes the amount of chlorophyll contained in the green vegetable and evaluates the freshness of the green vegetable based on the computed amount of chlorophyll.

The spectral image processing device 500 includes a CPU 510 configured to execute computer programs to implement various operations and controls, a memory 530 (estimation device storage module) configured to store the computer programs, data and information, and an input-output interface (I/F) 550 configured to receive image data from the multiband camera 600 and send the evaluation result of freshness to the display device 700.

The central wavelength data BD and the spectral estimation parameter M generated by the spectral estimation parameter generation device 100 described above are stored in advance in the memory 530. A freshness evaluation program (not shown) is also stored in advance in the memory 530. Alternatively the spectral estimation parameter M and the central wavelength data BD may be obtained from outside via a network, such as the Internet as needed basis and may be stored in the memory 530, instead of being stored in advance.

The CPU 510 executes the freshness evaluation program stored in the memory 530 to serve as a measurement band specifier 512, a spectral estimator 514 and a calibration/evaluation processor 516. The measurement band specifier 512 reads the central wavelength data BD from the memory 530 and sends the respective elements included in the central wavelength data BD to the multiband camera 600.

The multiband camera 600 may be identical with or may be the identical model with the multiband camera 400 (FIG. 3) described above. In other words, the multiband camera 600 is the model satisfying the filter spectral sensitivity ET and the photodiode spectral sensitivity PD stored in the ROM 30 of the spectral estimation parameter generation device 100. The multiband camera 600 sequentially changes the transparent wavelength range of the wavelength tunable filter 420 (FIG. 3) based on the respective elements of the central wavelength data BD specified by the measurement band specifier 512, takes images of the subject T in the plurality of bands, and sends the imaging results in the form of a multiband image to the spectral image processing device 500. The input-output interface 550 of the spectral image processing device 500 obtains the multiband image. The input-output interface 550 corresponds to the "multiband image acquirer" described in Summary section above.

The spectral estimator 514 of the spectral image processing device 500 estimates the spectrum of spectral reflectivity of the subject T from the multiband image output from the multiband camera 600. The spectral estimator 514 uses the spectral estimation parameter M stored in the memory 530 for this estimation. More specifically, the estimation process performs operation according to Equation (13) given below.

$$P = Mx \quad (13)$$

In Equation (13), "x" represents a matrix of values (pixel values) at a specific position in the multiband image, and "p" represents a matrix of optical spectrum at a location corresponding to the specific position. The "pixel values at a specific position in the multiband image" mean the pixel values at the specific position in the respective band images constituting the multiband image. The "location corresponding to the specific position" means the location in the sample T corresponding to the specific position and is hereinafter referred to as "specific location". This operation estimates the spectrum of spectral reflectivity at the specific location in the sample T. The spectral estimator 514 corresponds to the "optical spectrum operator" described in Summary section above.

The calibration/evaluation processor 516 computes the amount of chlorophyll from the estimated spectrum of spectral reflectivity obtained by the spectral estimator 514 and evaluates the freshness of the green vegetable as the subject T based on the computation result. The fresh vegetable has light absorption of chlorophyll at about 700 nm. The lower spectral reflectivity at the wavelength of light absorption of chlorophyll (i.e., at about 700 nm) is expected to have the greater amount of chlorophyll. The vegetable containing the greater amount of chlorophyll is evaluated to have the higher degree of freshness. For example, the vegetable containing the amount of chlorophyll of or above a preset value a may be evaluated as "excellent" freshness; the vegetable containing the amount of chlorophyll below the preset value a but of or above another preset value b (<a) may be evaluated as "good" freshness; and the vegetable containing the amount of chlorophyll below the preset value b may be evaluated as "poor" freshness. The calibration/evaluation processor 516 displays the result of evaluation on the display device 700 via the input-output interface 550.

The spectral image processing device 500 of the above configuration utilizes the spectral estimation parameter M generated by the spectral estimation parameter generation device 100 to estimate the spectrum of spectral reflectivity of the subject T with high accuracy. This results in evaluating the freshness of the green vegetable as the subject T with high accuracy. Additionally, during imaging with the multiband camera 600, the wavelength tunable filter is driven to successively set the wavelength bands specified by the central wavelength data BD correlated to the spectral estimation parameter M, so as to enable imaging in the respective bands corresponding to the spectral estimation parameter M. The spectral image processing device 500 of this embodiment accordingly enables the spectrum of spectral reflectivity to be estimated with high accuracy from the multiband image having the less number of bands. More specifically, even a small number of bands, such as 3 to 10 bands, allows highly-accurate estimation. The less number of bands used for measurement has the additional advantageous effect of the shorter imaging time.

The spectral estimation parameter generation device 100 according to this embodiment advantageously generates the spectral estimation parameter, which enables estimation of the highly-accurate spectrum of spectral reflectivity from the multiband image having the less number of bands.

According to the above embodiment, the spectral image processing device 500 specifies chlorophyll as the specific component used for evaluation and evaluates the freshness of the green vegetable.

According to another embodiment, the spectral image processing device 500 may specify oleic acid as the specific component used for evaluation and evaluate the palatability of meat. According to yet another embodiment, the spectral image processing device 500 may specify collagen as the specific component used for evaluation and evaluate the vitality of human skin. In such applications, although it is required to change the parameters used for processing by the calibration/evaluation processor to be suitable for the specific component used for evaluation, but there is no need to change the spectral estimation parameter M or the central wavelength data BD stored in the memory 530. In other words, the spectral estimation parameter M and the central wavelength data BD can be used in common, irrespective of the specific component used for evaluation. This is because the central wavelength data BD and the spectral estimation parameter M generated by the spectral estimation parameter generation device 100 of the embodiment cover the wide wavelength range, so as not to depend on the specific component used for evaluation.

The prior art method can set the spectral estimation parameter to cover the wide wavelength range so as not to depend on the specific component used for evaluation, but requires a large number of bands, such as 50 to 100 bands, in the multiband image taken with the multiband camera. The spectral estimation parameter generation device 100 of this embodiment, on the other hand, requires the significantly smaller number of bands for measurement as described above. The spectral estimation parameter generation device 100 of this embodiment thus advantageously generates the spectral estimation parameter with the less number of bands for measurement, while enabling estimation of the spectral distribution over the wide wavelength range.

A-4. Modification

The following describes one modification of the first embodiment described above. The modification differs from the first embodiment by the evaluation function F(S) computed at step S150, but otherwise has the similar configuration to that of the first embodiment. The evaluation function F(S) of this modification is expressed by Equation (14) given below.

$$F(S) = \|I - w(\lambda)(M \cdot D)\|^2 \quad (14)$$

In Equation (14), $\lambda$ represents the wavelength, and $w(\lambda)$ represents the weighting coefficient. The evaluation function F(S) according to Equation (14) enables optimization with consideration of the weighting coefficient $w(\lambda)$ for each wavelength. The weighting coefficient $w(\lambda)$ may be shown by, for example, Equation (15) given below.

$$w(\lambda) = \text{diag}\{z(z^t z)z^t\} \quad (15)$$

In Equation (15), $z(\lambda)$ represents the color-matching function, and "diag" represents the operation of extracting the diagonal elements from the matrix.

Figure 8:
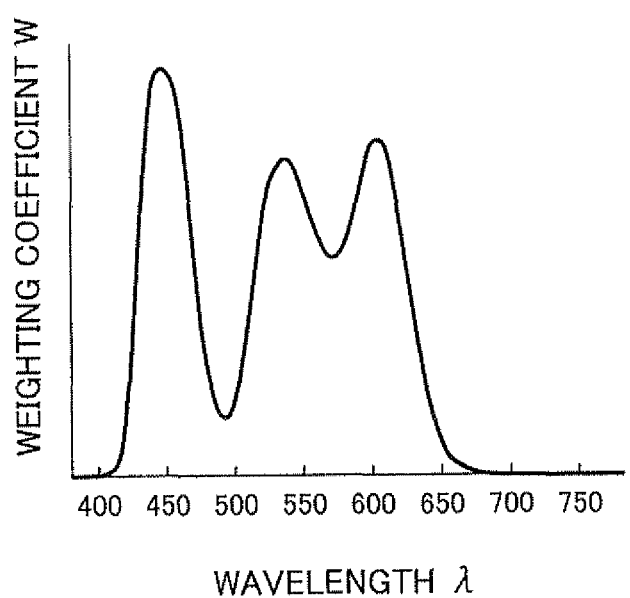
FIG. 8 is a graph showing a variation in weighting coefficient w against the wavelength λ.

FIG. 8 is a graph showing the variation in weighting coefficient w against the wavelength $\lambda$. As illustrated, the weighting coefficient-wavelength curve $w(\lambda)$ is similar to the graph of the color-matching function.

According to this modification, the spectrum of spectral reflectivity estimated from the camera output signal D obtained through the filter at the central wavelength assumed to minimize the evaluation function F(S) is equivalent to the spectrum optimized on the basis of visual color difference. This modification thus enables estimation of the spectrum of spectral reflectivity with consideration of the color difference.

The spectrum of spectral reflectivity estimated in this modification includes a significant error, when the simple squared error from the measured spectrum is calculated. In one preferable application, either the evaluation function F(S) according to Equation (10) of the first embodiment or the evaluation function F(S) according to Equation (13) of the modification is selected depending on the intended use to place emphasis on the estimation accuracy of the spectral distribution or to take into account the color difference.

The evaluation function used in the spectral estimation parameter generating process is not limited to the evaluation function described in the first embodiment or the evaluation function described in its modification, but may be any suitable evaluation function, for example, an evaluation function defined by summation of the squared errors and the weighted maximum errors. As long as the evaluation function is defined to correlate the spectral distribution of each color chart measured with the colorimeter to the spectral estimation value, the evaluation function may additionally include another factor.

B. Second Embodiment

The following describes a second embodiment. A spectral estimation parameter generation device according to the second embodiment has the same hardware configuration as that of the spectral estimation parameter generation device 100 of the first embodiment described above, and only differs by part of the software configuration or more specifically the procedure of the spectral estimation parameter generating process executed by the CPU 10. In the description below, the like constituents to those of the first embodiment are shown by the like symbols to those of the first embodiment.

Figure 9:
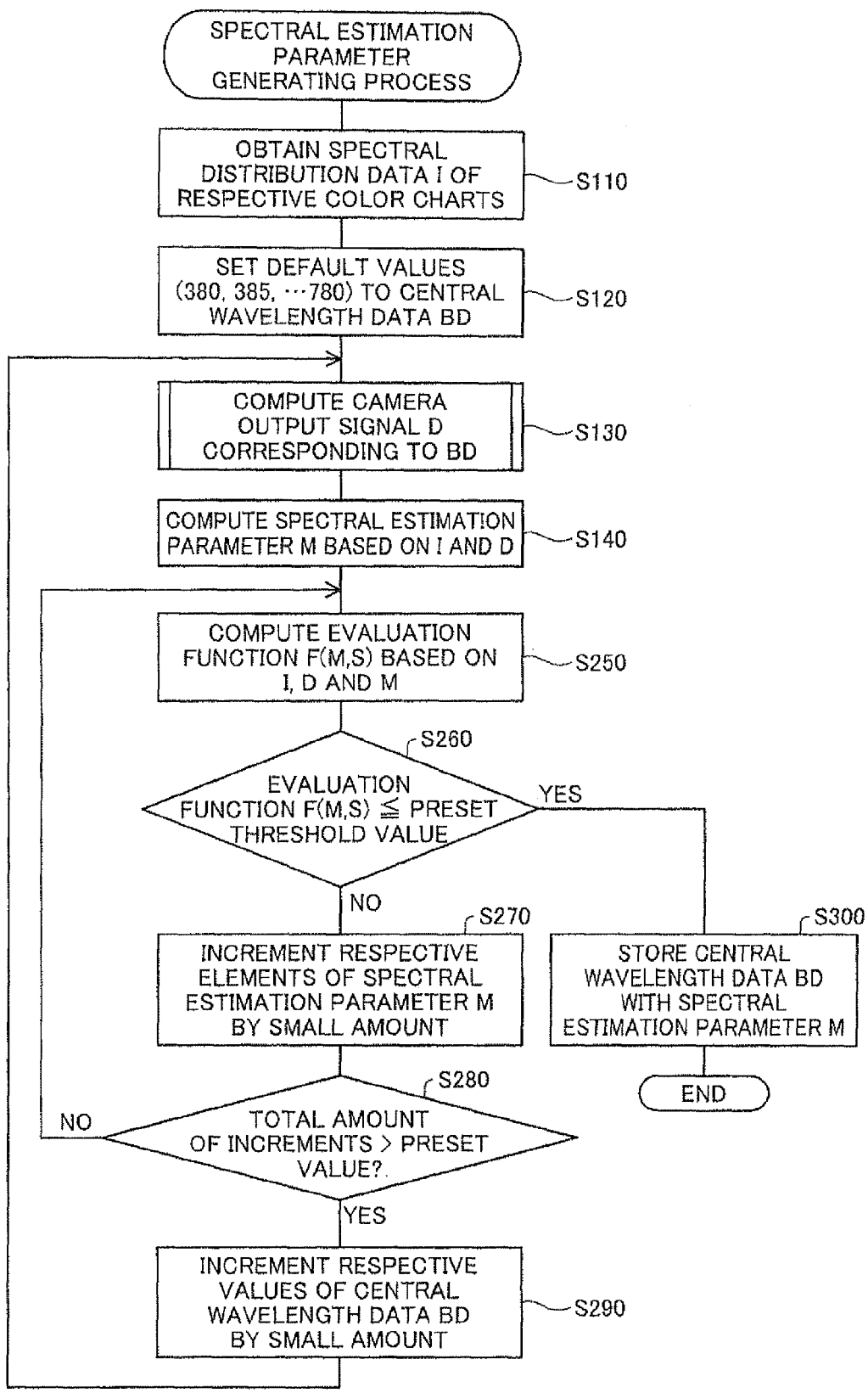
FIG. 9 is a flowchart showing a procedure of spectral estimation parameter generating process according to a second embodiment.

FIG. 9 is a flowchart showing a procedure of spectral estimation parameter generating process according to the second embodiment. Steps S110 to S140 are identical with those of the first embodiment and accordingly have the same step numbers. After the computation at step S140, the CPU 10 computes an evaluation function F(M,S) based on the spectral distribution I obtained at step S110, the camera output signal D computed at step S130 and the spectral estimation parameter M computed at step S140 (step S250).

Whilst the evaluation function F is the function of the camera spectral sensitivity S according to the first embodiment, the evaluation function F is the function of the camera spectral sensitivity S and the spectral estimation parameter M according to this embodiment. The linear evaluation function F can be assumed to only depend on the camera spectral sensitivity S as described above in the first embodiment. The nonlinear evaluation function F due to a change in monitor display color spectral feature or a tone change in color of the subject cannot, however, be assumed to only depend on the camera spectral sensitivity S. The evaluation function F of the second embodiment is accordingly defined as the function of the camera spectral sensitivity S and the spectral estimation parameter M.

The evaluation function F(M,S) is defined according to Equation (16) given below. There is a relationship between the camera output signal D, the spectral distribution I and the camera spectral sensitivity S shown by Equation (17) given below.

$$F(M,S) = \|I - M \cdot D\|^2 \quad (16)$$

$$D = I \cdot S \quad (17)$$

After the computation at step S250, the CPU 10 determines whether the evaluation function F(M,S) computed at step S250 is equal to or less than a preset threshold value (step S260). When it is determined that the evaluation function F(M,S) is not equal to or less than the preset threshold value but is greater than the preset threshold value (step S260: No), the CPU 10 increments the respective elements of the spectral estimation parameter M by a small amount (step S270). The CPU 10 subsequently determines whether the total amount of increments at step S270 exceeds a preset value (step S280). The preset value herein is an expected value of maximum possible change in spectral estimation parameter M when the respective values of the central wavelength data BD are subsequently incremented by a small amount.

When it is determined that the total amount of increments does not exceed the preset value (step S280: No), the processing flow goes back to step S250 and repeats the processing of steps S250 to S270. Repeating the processing of steps S250 to S270 successively varies the values of the respective elements in the spectral estimation parameter M with fixing the camera spectral sensitivity S and determines whether the evaluation function F(M,S) becomes equal to or less than the preset threshold value.

When it is determined that the total amount of increments exceeds the preset value (step S280: Yes) while failing to refine the evaluation function F(M,S) to be equal to or less than the preset threshold value, the CPU 10 increments the respective values of the central wavelength data BD by a small amount (step S290). This processing of step S290 is identical with the processing of step S170 in the first embodiment. The small amount is, for example, 0.1 nm. The total amount of increments at step S270 is reset to zero when the processing flow goes to step S290.

After increment at step S290, the CPU 10, the CPU 10 returns the processing flow to step S130 and repeats the processing of steps S130 to S290. The processing of steps S130 to S280 is performed for the new values of the central wavelength data BD incremented at step S290. Repeating this series of processing sequentially increments the respective values of the central wavelength data BD by the small amount, successively varies the values of the respective elements in the spectral estimation parameter M at each incremented set of central wavelengths (i.e., with fixing the camera spectral sensitivity S), and determines whether the evaluation function F(M,S) becomes equal to or less than the preset threshold value.

When it is determined that the evaluation function F(M,S) is equal to or less than the preset threshold value (step S260: Yes), i.e., when it is assumed that the evaluation function F(M,S) is optimized, the CPU 10 stores the central wavelength data BD and the spectral estimation parameter M on the optimization (strictly speaking, on the assumption of optimization like the first embodiment) of the evaluation function F(M,S) (step S300). This processing of step S300 is identical with the processing of step S180 in the first embodiment. After step S300, this spectral estimation parameter generating process is terminated.

Repeating the processing of steps S130 to S290 is equivalent to the operation of Equation (18) given below.

$$(S_1, S_2, \ldots S_m, M) = \arg\min\{F(M,S)\} \quad (18)$$

Equation (18) gives a set of values of the spectral estimation parameter M and the camera spectral sensitivity S for the minimized evaluation function F(M,S).

Like the spectral estimation parameter generation device 100 of the first embodiment, the spectral estimation parameter generation device of the second embodiment enables highly-accurate estimation of the spectrum of spectral reflectivity from the multiband image having the less number of bands. Additionally the spectral estimation parameter generation device of the second embodiment can refine even the nonlinear evaluation function F to the target value. This results in generating the spectral estimation parameter that allows spectral estimation with higher accuracy.

One modification of the second embodiment may adopt the same configuration as that of the modification of the first embodiment described above. The evaluation function F(M, S) may be defined with consideration of the wavelength-dependent weighting factor w($\lambda$). Like the modification of the first embodiment, such modification of the second embodiment allows estimation of the spectrum of spectral reflectivity with consideration of the color difference.

C. Modifications

Modification 1

The spectral estimation parameter generation device 100 generating the spectral estimation parameter and the spectral image processing device 500 utilizing the generated spectral estimation parameter are provided as separate devices according to the above embodiments and their modifications, but may be designed as an integral system. For example, a general-purpose computer may be configured to have both the functions of the spectral estimation parameter generation device 100 and the functions of the spectral image processing device 500.

Modification 2

According to the above embodiments and their modifications, the functions implemented by the software configuration may be implemented by the hardware configuration, for example, a discrete electronic circuit.

While the invention has been described with reference to exemplary embodiments thereof, it is to be understood that the invention is not limited only to the disclosed embodiments or constructions. On the is contrary, the invention is intended to cover various modifications and equivalent arrangements. In addition, while the various elements of the disclosed invention are shown in various combinations and configurations, which are exemplary, other combinations and configurations, including fewer elements or only a single element, are also within the spirit and scope of the invention.

What is claimed is:

1. A parameter generation device configured to generate a spectral estimation parameter, which is used to estimate a spectrum of spectral reflectivity of a subject, from a multiband image of the subject taken in a plurality of wavelength bands set by driving a wavelength tunable filter and output from a multiband camera, the parameter generation device comprising:
a default value setting module configured to set default values to band specification data used to specify the plurality of wavelength bands;
a spectral measurement device configured to measure a spectral distribution with respect to each of a plurality of color charts;
a camera output computing module configured to compute a camera output signal representing a multiband image taken by and output from the multiband camera with respect to each of the color charts, based on spectral sensitivity of the multiband camera in the plurality of wavelength bands specified by the band specification data and spectral feature of light from the each color chart;
a parameter candidate value computing module configured to compute a candidate value of the spectral estimation parameter, based on the spectral distribution of the each color chart measured by the spectral measurement device and the camera output signal computed by the camera output computing module;

an evaluation function controller configured to successively vary the band specification data from the default values to make an evaluation function approach a target value and determine a spectral estimation parameter corresponding to the band specification data when the evaluation function reaches the target value, wherein the evaluation function is defined to correlate the spectral distribution of the each color chart measured by the spectral measurement device to a spectral estimation value computed from the candidate value of the spectral estimation parameter and the camera output signal; and a storage module configured to store the spectral estimation parameter determined by the evaluation function controller and the band specification data when the evaluation function reaches the target value.

2. The parameter generation device according to claim 1, wherein
the evaluation function controller is configured to sequentially change the candidate value of the spectral estimation parameter.

3. The parameter generation device according to claim 1, wherein
the evaluation function includes a weighting coefficient based on a color-matching function.

4. The parameter generation device according to claim 1, wherein
the evaluation function is defined by squared norm of error of the spectral estimation value relative to the spectral distribution of the each color chart.

5. A spectral estimation device configured to estimate a spectrum of spectral reflectivity of a subject from a multiband image of the subject taken in a plurality of wavelength bands set by driving a wavelength tunable filter and output from a multiband camera, the spectral estimation device comprising:

an estimation device storage module configured to store a spectral estimation parameter, which is used to estimate a spectrum of spectral reflectivity of the subject, and band specification data used to specify the plurality of wavelength bands;

a band specifier configured to send the band specification data stored in the estimation device storage module to the multiband camera and thereby specify the plurality of wavelength bands for imaging with the multiband camera;

a multiband image acquirer configured to obtain a multiband image taken in the respective wavelength bands from the multiband camera; and an optical spectrum operator configured to compute the spectrum of spectral reflectivity from the multiband image using the spectral estimation parameter stored in the estimation device storage module.

6. A method of generating a spectral estimation parameter, which is used to estimate a spectrum of spectral reflectivity of a subject, from a multiband image of the subject taken in a plurality of wavelength bands set by driving a wavelength tunable filter and output from a multiband camera, the method comprising:

setting default values to band specification data used to specify the plurality of wavelength bands;

measuring a spectral distribution with respect to each of a plurality of color charts by a spectral measurement device;

computing a camera output signal representing a multiband image taken by and output from the multiband camera with respect to each of the color charts, based on spectral sensitivity of the multiband camera in the plurality of wavelength bands specified by the band specification data and spectral feature of light from the each color chart;

computing a candidate value of the spectral estimation parameter, based on the spectral distribution of the each color chart measured by the spectral measurement device and the camera output signal;

successively varying the band specification data from the default values to make an evaluation function approach a target value and determining a spectral estimation parameter corresponding to the band specification data when the evaluation function reaches the target value, wherein the evaluation function is defined to correlate the spectral distribution of the each color chart measured by the spectral measurement device to a spectral estimation value computed from the candidate value of the spectral estimation parameter and the camera output signal; and storing the determined spectral estimation parameter and the band specification data when the evaluation function reaches the target value, into a storage module.

* * * * *